United States Patent
Tsuchiya et al.

(10) Patent No.: US 10,858,563 B2
(45) Date of Patent: Dec. 8, 2020

(54) METHOD FOR TRANSFER-FILLING REFRIGERANT COMPOSITION

(71) Applicant: DAIKIN INDUSTRIES, LTD., Osaka (JP)

(72) Inventors: Tatsumi Tsuchiya, Osaka (JP); Mitsushi Itano, Osaka (JP); Hitomi Kuroki, Osaka (JP); Yasufu Yamada, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/327,599

(22) PCT Filed: Nov. 28, 2017

(86) PCT No.: PCT/JP2017/042591
§ 371 (c)(1),
(2) Date: Feb. 22, 2019

(87) PCT Pub. No.: WO2018/097310
PCT Pub. Date: May 31, 2018

(65) Prior Publication Data
US 2019/0211246 A1    Jul. 11, 2019

(30) Foreign Application Priority Data

Nov. 28, 2016  (JP) ................................ 2016-229822

(51) Int. Cl.
*C09K 5/04*    (2006.01)
*F25B 45/00*    (2006.01)
*F17C 5/02*    (2006.01)

(52) U.S. Cl.
CPC ............... *C09K 5/045* (2013.01); *F17C 5/02* (2013.01); *F25B 45/00* (2013.01);
(Continued)

(58) Field of Classification Search
CPC ............................ C09K 5/045; C09K 2205/22
See application file for complete search history.

(56) References Cited

U.S. PATENT DOCUMENTS

| 5,711,158 A | 1/1998 | Yoshida et al. |
| 6,000,230 A | 12/1999 | Kanno et al. |

(Continued)

FOREIGN PATENT DOCUMENTS

| EP | 509673 A1 * | 10/1992 |
| EP | 0 979 855 | 2/2000 |

(Continued)

OTHER PUBLICATIONS

International Search Report dated Jan. 16, 2018 in International (PCT) Application No. PCT/JP2017/042591.

(Continued)

*Primary Examiner* — John R Hardee
(74) *Attorney, Agent, or Firm* — Wenderoth, Lind & Ponack, L.L.P.

(57) ABSTRACT

Provided is a method for transferring a refrigerant composition containing three components (difluoromethane, pentafluoroethane, and 1,1,1,2-tetrafluoroethane) such that the compositional change of the liquid phase due to the phase transition that occurs in the supply source when transferring the refrigerant composition falls within a tolerance range. The method for transferring a refrigerant composition containing difluoromethane, pentafluoroethane, and 1,1,1,2-tetrafluoroethane includes transferring a refrigerant composition from a liquid phase in a supply source to a supply destination, wherein the liquid phase of the refrigerant composition in the supply source before the transfer contains 32.5 to 33.5 wt % of difluoromethane, 14.3 to 16.0 wt % of pentafluoroethane, and 50.5 to 53.2 wt % of 1,1,1,2-tetrafluoroethane.

3 Claims, 2 Drawing Sheets

(52) U.S. Cl.
CPC .... *C09K 2205/122* (2013.01); *C09K 2205/22* (2013.01); *F25B 2400/12* (2013.01)

(56) References Cited

U.S. PATENT DOCUMENTS

| | | | |
|---|---|---|---|
| 6,018,952 A | 2/2000 | Ide et al. | |
| 6,058,717 A | 5/2000 | Ide et al. | |
| 6,667,285 B1 * | 12/2003 | Kawahara | C10M 169/04 |
| | | | 508/485 |
| 10,005,940 B2 * | 6/2018 | Itano | C10M 107/34 |
| 2016/0251556 A1 * | 9/2016 | Poole | C09K 5/045 |
| | | | 252/67 |
| 2016/0290687 A1 | 10/2016 | Barban et al. | |
| 2016/0369144 A1 | 12/2016 | Tsuchiya et al. | |
| 2017/0074747 A1 * | 3/2017 | Scancarello | C09K 5/041 |
| 2017/0174967 A1 | 6/2017 | Itano et al. | |

FOREIGN PATENT DOCUMENTS

| | | | |
|---|---|---|---|
| EP | 979855 | * | 2/2000 |
| JP | 10-160296 | | 6/1998 |
| JP | 11-124569 | | 5/1999 |
| JP | 2015-129272 | | 7/2015 |
| WO | 96/33377 | | 10/1996 |
| WO | 2015/075393 | | 5/2015 |
| WO | 2016/132818 | | 8/2016 |

OTHER PUBLICATIONS

Extended European Search Report dated Oct. 9, 2019 in corresponding European Patent Application No. 17872927.3.

* cited by examiner

METHOD FOR TRANSFER-FILLING REFRIGERANT COMPOSITION

TECHNICAL FIELD

The present invention relates to methods for transferring a refrigerant composition. More specifically, the invention relates to methods for transferring a refrigerant composition containing difluoromethane (HFC-32 or R32), pentafluoroethane (HFC-125 or R125), and 1,1,1,2-tetrafluoroethane (HFC-134a or R134a).

BACKGROUND ART

A mixture of hydrofluorocarbons (HFC) with no chlorine in their molecular structure, such as difluoromethane (HFC-32, boiling point: −52° C.), pentafluoroethane (HFC-125, boiling point: −48° C.), 1,1,1,2-tetrafluoroethane (HFC-134a, boiling point: −27° C.), and 1,1,1-trifluoroethane (HFC-143a, boiling point: −48° C.), has been used as a refrigerant composition for use in equipment such as air conditioners, freezing machines, and refrigerators.

For example, the following refrigerant compositions composed only of three components, HFC-32, HFC-125, and HFC-134a, have been suggested: R407C (a refrigerant composition composed only of the following three components: 23 wt % of HFC-32, 25 wt % of HFC-125, and 52 wt % of HFC-134a); R407E (a refrigerant composition composed only of the following three components: 25 wt % of HFC-32, 15 wt % of HFC-125, and 60 wt % of HFC-134a); R407F (a refrigerant composition composed only of the following three components: 30 wt % of HFC-32, 30 wt % of HFC-125, and 40 wt % of HFC-134a); a refrigerant composition composed only of the following three components: 32.5 wt % of HFC-32, 15 wt % of HFC-125, and 52.5 wt % of HFC-134a (this refrigerant composition has already been applied for registration as R407H under ASHRAE34); and a refrigerant composition composed only of the following three components: 40.0 wt % of HFC-32, 30.0 wt % of HFC-125, and 30.0 wt % of HFC-134a (see PTL 1; hereinafter, this composition may be referred to as "D407HT").

The refrigerant composition composed only of the three components HFC-32, HFC-125, and HFC-134a is zeotropic. When the refrigerant composition undergoes phase transition, such as evaporation or condensation, a component having a low boiling point is likely to evaporate, while a component having a high boiling point is likely to condense, thereby causing a compositional change. This trend is more noticeable in evaporation, or in a phase transition from liquid to gas, and also becomes more apparent as the gap of boiling points becomes wider between the components of the refrigerant composition. Thus, when a zeotropic refrigerant composition is moved (transferred) from an airtight container filled with the composition to another container or apparatus, the composition is typically extracted from the liquid phase so as not to cause a phase transition.

However, a wide gap of boiling points between the components of the refrigerant composition results in evaporation of a component with a low boiling point in the liquid phase, even when the composition is extracted from the liquid phase, due to a decrease in the pressure or an increase in the space of the gas phase caused by the extraction of the refrigerant composition, thus causing a compositional change of the liquid phase within the range of a few percentages by weight. This compositional change of the liquid phase within the range of a few percentages by weight would bring a substantial change in the performance of the refrigerant, and have a great impact on the safety of the refrigerant, such as flammability, while reducing the capability or efficiency.

Due to its zeotropic properties and large gap of boiling points between the components of the refrigerant composition composed only of three components HFC-32, HFC-125, and HFC-134a, the compositional change of the liquid phase that occurs in transferring the refrigerant composition from a supply source vessel (e.g., a tank, an ISO container, a tanker truck, or a storage tank) to a supply destination vessel or equipment (e.g., another tank or refrigeration and air conditioning equipment) cannot be ignored from the performance viewpoint. Additionally, not only from the performance viewpoint, but also from the perspective of quality assurance of the mixture refrigerant, tolerance as an allowable range of the proportions of the components of the refrigerant composition is established. It is extremely important that the compositional change of the liquid phase fall within the range of tolerance.

For a refrigerant composition (R4070), which is composed only of three components, HFC-32, HFC-125, and HFC-134a, and whose allowable range (tolerance) is 22 to 24 wt % for HFC-32, 23 to 27 wt % for HFC-125, and 50 to 54 wt % for HFC-134a, the present inventors developed a technique to enable the compositional change of the liquid phase due to a phase transition caused by transfer to remain within the range of tolerance even when the refrigerant composition is transferred, by adjusting the proportion of each component, HFC-32, HFC-125, and HFC-134a, of the refrigerant composition contained in a supply source vessel so as to fall within a specific range (e.g., see PTL 2 and 3).

However, the compositional change of the liquid phase of a refrigerant composition due to a phase transition caused by transfer of the composition greatly varies between refrigerant compositions, depending on the proportion of each component, tolerance range, transfer rate, etc., even if the refrigerant compositions are formed of the same components. Thus, it is extremely difficult to predict the compositional change of the liquid phase of a refrigerant composition that differs from R407C in the proportions of components in view of the findings of PTL 2 or 3.

CITATION LIST

Patent Literature

PTL 1: JP2015-129272A
PTL 2: WO96/33377
PTL 3: JPH10-160296A

SUMMARY OF INVENTION

Technical Problem

The present invention was made in view of the problem and current status in the art, and an object is to provide a method for transferring a refrigerant composition containing three components, difluoromethane, pentafluoroethane, and 1,1,1,2-tetrafluoroethane, such that the compositional change of the liquid phase due to the phase transition that occurs in the supply source in transferring the refrigerant composition falls within a tolerance range.

Solution to Problem

The present inventors conducted extensive research to solve the problem, and found that the compositional change of the liquid phase due to a phase transition that occurs in a supply source in transferring a refrigerant composition containing three components, difluoromethane, pentafluoroethane, and 1,1,1,2-tetrafluoroethane, from the supply source to a supply destination, surprisingly falls within a range of tolerance, when the proportion of each component in the liquid phase of the composition in the supply source before transferring the composition is adjusted so as to fall within a specific range that is within the range of tolerance. The inventors further found that the compositional change of the liquid phase due to a phase transition that occurs in the supply source in transferring the refrigerant composition, from a supply source to a supply destination, even at a high transfer rate, falls within a range of tolerance, when the proportion of each component in the liquid phase of the composition in the supply source before transfer is adjusted so as to fall within a specific range that is within the range of tolerance. The inventors conducted further research based on these findings and completed the present invention.

Specifically, the present invention includes subject matter described in the following items.

Item 1.

A method for transferring a refrigerant composition containing difluoromethane, pentafluoroethane, and 1,1,1,2-tetrafluoroethane, the method comprising transferring a refrigerant composition from a liquid phase in a supply source to a supply destination, wherein the liquid phase of the refrigerant composition in the supply source before the transfer contains 32.5 to 33.5 wt % of difluoromethane, 14.3 to 16.0 wt % of pentafluoroethane, and 50.5 to 53.2 wt % of 1,1,1,2-tetrafluoroethane.

Item 2.

The method according to item 1, wherein the liquid phase of the refrigerant composition in the supply source before the transfer contains 32.9 to 33.5 wt % of difluoromethane, 14.4 to 16.0 wt % of pentafluoroethane, and 50.5 to 52.7 wt % of 1,1,1,2-tetrafluoroethane.

Item 3.

The method according to item 1, wherein the liquid phase of the refrigerant composition in the supply source before the transfer contains 33.4 to 33.5 wt % of difluoromethane, 14.6 to 16.0 wt % of pentafluoroethane, and 50.5 to 52.0 wt % of 1,1,1,2-tetrafluoroethane.

Item 4.

A method for transferring a refrigerant composition containing difluoromethane, pentafluoroethane, and 1,1,1,2-tetrafluoroethane, the method comprising transferring a refrigerant composition from a liquid phase in a supply source to a supply destination, wherein the liquid phase of the refrigerant composition in the supply source before the transfer contains 29.7 to 31.0 wt % of difluoromethane, 29.7 to 31.0 wt % of pentafluoroethane, and 38.0 to 40.6 wt % of 1,1,1,2-tetrafluoroethane.

Item 5.

The method according to item 4, wherein the liquid phase of the refrigerant composition in the supply source before the transfer contains 29.9 to 31.0 wt % of difluoromethane, 29.9 to 31.0 wt % of pentafluoroethane, and 38.0 to 40.2 wt % of 1,1,1,2-tetrafluoroethane.

Item 6.

The method according to item 4, wherein the liquid phase of the refrigerant composition in the supply source before the transfer contains 30.3 to 31.0 wt % of difluoromethane, 30.3 to 31.0 wt % of pentafluoroethane, and 38.0 to 39.4 wt % of 1,1,1,2-tetrafluoroethane.

Item 7.

A method for transferring a refrigerant composition containing difluoromethane, pentafluoroethane, and 1,1,1,2-tetrafluoroethane, the method comprising transferring a refrigerant composition from a liquid phase in a supply source to a supply destination, wherein the liquid phase of the refrigerant composition in the supply source before the transfer contains 39.9 to 41.0 wt % of difluoromethane, 29.3 to 31.0 wt % of pentafluoroethane, and 28.0 to 30.8 wt % of 1,1,1,2-tetrafluoroethane.

Item 8.

The method according to item 7, wherein the liquid phase of the refrigerant composition in the supply source before the transfer contains 40.2 to 41.0 wt % of difluoromethane, 29.5 to 31.0 wt % of pentafluoroethane, and 28.0 to 30.3 wt % of 1,1,1,2-tetrafluoroethane.

Item 9.

The method according to item 7, wherein the liquid phase of the refrigerant composition in the supply source before the transfer contains 40.7 to 41.0 wt % of difluoromethane, 29.7 to 31.0 wt % of pentafluoroethane, and 28.0 to 29.6 wt % of 1,1,1,2-tetrafluoroethane.

Item 10.

A method for transferring a refrigerant composition containing difluoromethane, pentafluoroethane, and 1,1,1,2-tetrafluoroethane, the method comprising transferring a refrigerant composition from a liquid phase in a supply source to a supply destination, wherein the liquid phase of the refrigerant composition in the supply source before the transfer contains 24.4 to 26.0 wt % of difluoromethane, 14.9 to 16.0 wt % of pentafluoroethane, and 58.0 to 60.7 wt % of 1,1,1,2-tetrafluoroethane.

Item 11.

The method according to item 10, wherein the liquid phase of the refrigerant composition in the supply source before the transfer contains 24.8 to 26.0 wt % of difluoromethane, 14.9 to 16.0 wt % of pentafluoroethane, and 58.0 to 60.3 wt % of 1,1,1,2-tetrafluoroethane.

Item 12.

The method according to item 10, wherein the liquid phase of the refrigerant composition in the supply source before the transfer contains 25.3 to 26.0 wt % of difluoromethane, 15.1 to 16.0 wt % of pentafluoroethane, and 58.0 to 59.6 wt % of 1,1,1,2-tetrafluoroethane.

Advantageous Effects of Invention

The present invention enables the transfer of a refrigerant composition containing three components, difluoromethane, pentafluoroethane, and 1,1,1,2-tetrafluoroethane, from the liquid phase in a supply source to a supply destination such that the compositional change of the liquid phase due to a phase transition that occurs in the supply source in transferring the composition falls within a range of tolerance. This reduces or prevents a decrease in refrigerant performance or combustion risk of the refrigerant composition.

DESCRIPTION OF EMBODIMENTS

Figure 1:
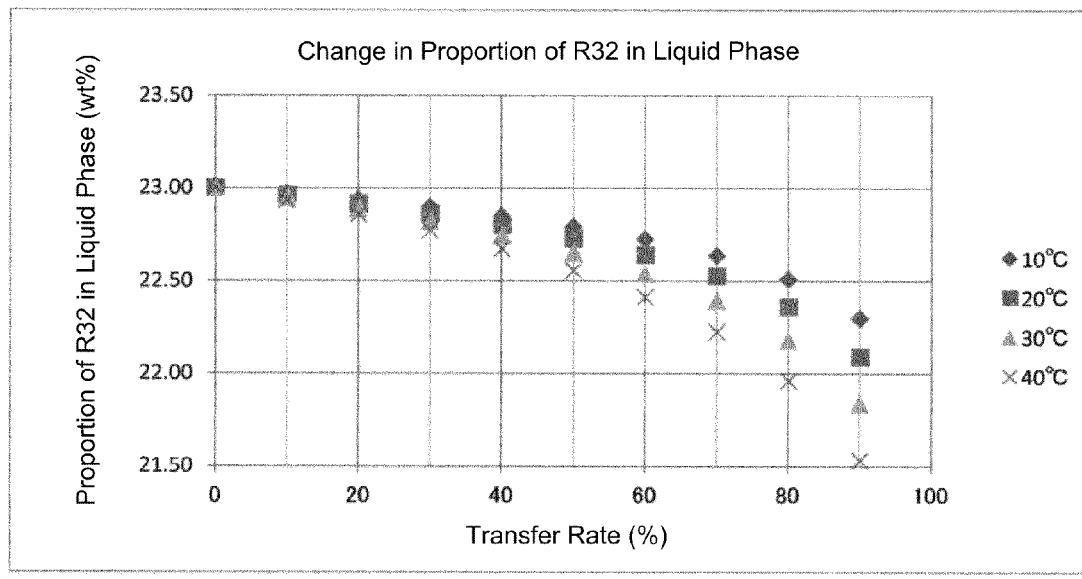
FIG. 1 is a chart illustrating the results of Reference Example 1 (a change in the proportion of difluoromethane in the liquid phase).

The following describes the present invention in detail.

The present invention relates to a method for transferring a refrigerant composition containing difluoromethane (HFC-32 or R32), pentafluoroethane (HFC-125 or R125), and 1,1,1,2-tetrafluoroethane (HFC-134a or R134a). In this specification, the method may be referred to as "the method of the present invention."

The method of the present invention comprises transferring a refrigerant composition from the liquid phase in a supply source to a supply destination. In this specification, this step may be referred to as "transfer step."

The supply source is not limited, as long as the supply source can store a refrigerant composition, and is hermetically sealed. Examples include airtight containers, such as cans, 5- to 1000-L tanks, ISO containers, tanker trucks, and fixed storage tanks.

The supply destination is not limited, as long as the supply destination can store the refrigerant composition supplied from the supply source, and is hermetically sealed. Examples include airtight containers, such as cans, 5- to 1000-L tanks, ISO containers, and fixed storage tanks, and equipment, such as cooling and heating equipment, freezers, refrigerators, and hot-water supply equipment.

In the transfer step, the refrigerant composition in the supply source is transferred to charge the supply destination with the composition. When the refrigerant composition for use in the present invention undergoes phase transition such as evaporation or condensation, its component with a low boiling point is likely to evaporate, while its component with a high boiling point is likely to condense, causing a compositional change in the refrigerant composition. This trend is more noticeable in evaporation. Thus, the transfer step has a feature in that when a refrigerant composition is transferred from a supply source to a supply destination, the refrigerant composition is extracted from the liquid phase in the supply source to charge the supply destination with the composition. Transferring the composition from the liquid phase in the supply source to the supply destination enables the compositional change in the liquid phase due to the phase transition that occurs in transferring the refrigerant composition to fall within a range of tolerance. The transfer is preferably performed in such an environment that the outside air temperature is 40° C. or below.

The refrigerant composition for use in the method of the present invention contains the following three components: difluoromethane (HFC-32), pentafluoroethane (HFC-125), and 1,1,1,2-tetrafluoroethane (HFC-134a). The refrigerant composition may contain hydrocarbons or halogenated carbons other than difluoromethane, pentafluoroethane, and 1,1,1,2-tetrafluoroethane. In order to not impair the effect of the present invention, difluoromethane, pentafluoroethane, and 1,1,1,2-tetrafluoroethane in the refrigerant composition are present in a total amount of preferably 95 wt % or more, more preferably 99 wt % or more, still more preferably 99.5 wt % or more, and particularly preferably 99.9 wt % or more, of the entire refrigerant composition (100 wt %). Examples of hydrocarbons other than difluoromethane, pentafluoroethane, and 1,1,1,2-tetrafluoroethane include propane, butane, and pentane (including isomers thereof), and examples of halogenated carbons other than difluoromethane, pentafluoroethane, and 1,1,1,2-tetrafluoroethane include R23, R22, R41, R143, R152, HFO-1234, HFO-1243, and HCFO-1233 (including isomers thereof).

The refrigerant composition for use in the method of the present invention preferably consists essentially of difluoromethane, pentafluoroethane, and 1,1,1,2-tetrafluoroethane. In this specification, the phrase "consists essentially of difluoromethane, pentafluoroethane, and 1,1,1,2-tetrafluoroethane" includes embodiments in which the refrigerant composition also contains a hydrocarbon and/or halogenated carbon other than difluoromethane, pentafluoroethane, and 1,1,1,2-tetrafluoroethane; and the refrigerant composition contains the hydrocarbon and/or halogenated carbon in such an amount that the hydrocarbon and/or halogenated carbon does not affect the refrigerant properties of the refrigerant composition containing difluoromethane, pentafluoroethane, and 1,1,1,2-tetrafluoroethane.

The refrigerant composition for use in the method of the present invention particularly preferably consists only of three components, difluoromethane, pentafluoroethane, and 1,1,1,2-tetrafluoroethane. In other words, the refrigerant composition for use in the method of the present invention particularly preferably contains difluoromethane, pentafluoroethane, and 1,1,1,2-tetrafluoroethane in a total amount of 100 wt % of the entire refrigerant composition (100 wt %).

The proportions of the components of the refrigerant composition for use in the method according to the present invention fall within any of the following ranges of tolerance A to D. The percentages of the following ranges of tolerance A to D are based on the total amount of difluoromethane, pentafluoroethane, and 1,1,1,2-tetrafluoroethane (100 wt %).
Range of Tolerance A
Difluoromethane: 31.5 to 33.5 wt %
Pentafluoroethane: 14.0 to 16.0 wt %
1,1,1,2-Tetrafluoroethane: 50.5 to 54.5 wt %
Range of Tolerance B
Difluoromethane: 28.0 to 32.0 wt %
Pentafluoroethane: 28.0 to 32.0 wt %
1,1,1,2-Tetrafluoroethane: 38.0 to 42.0 wt %
Range of Tolerance C
Difluoromethane: 39.0 to 41.0 wt %
Pentafluoroethane: 29.0 to 31.0 wt %
1,1,1,2-Tetrafluoroethane: 28.0 to 32.0 wt %
Range of Tolerance D
Difluoromethane: 23.0 to 27.0 wt %
Pentafluoroethane: 13.0 to 17.0 wt %
1,1,1,2-Tetrafluoroethane: 58.0 to 62.0 wt %

In this specification, "tolerance" refers to an acceptable range determined based on the midrange of the proportions of the components of a refrigerant by an applicant who applies for approval of the refrigerant with ASHRAE, taking into consideration the quality, performance, and flammability of the refrigerant.

Examples of a refrigerant composition that falls within the range of tolerance A include a refrigerant composition that consists only of the following three components: 32.5 wt % of difluoromethane, 15.0 wt % of pentafluoroethane, and 52.5 wt % of 1,1,1,2-tetrafluoroethane. This mixture refrigerant composition has already been applied for registration as R407H under ASHRAE34 at the time of filing of the present application.

Examples of a refrigerant composition that falls within the range of tolerance B include a refrigerant composition that consists only of the following three components: 30.0 wt % of difluoromethane, 30.0 wt % of pentafluoroethane, and 40.0 wt % of 1,1,1,2-tetrafluoroethane (R407F).

Examples of a refrigerant composition that falls within the range of tolerance C include a refrigerant composition that consists only of the following three components: 40.0 wt % of difluoromethane, 30.0 wt % of pentafluoroethane, and 30.0 wt % of 1,1,1,2-tetrafluoroethane (D407HT).

Examples of a refrigerant composition that falls within the range of tolerance D include a refrigerant composition that consists only of the following three components: 25.0 wt % of difluoromethane, 15.0 wt % of pentafluoroethane, and 60.0 wt % of 1,1,1,2-tetrafluoroethane (R407E).

A feature of the method according to the present invention is that the proportions of the components in the liquid phase of the refrigerant composition in the supply source before transfer fall within a specific range. Specifically, a feature of the method is to use a refrigerant composition adjusted such that the proportions of the components in the liquid phase of the refrigerant composition in the supply source before transferring the refrigerant composition to the supply destination fall within a specific range.

More specifically, to transfer a refrigerant composition that falls within the range of tolerance A, one of the following three types of refrigerant compositions is used whose liquid phase is composed as described below (the three compositions are hereinafter referred to as "refrigerant composition A1," "refrigerant composition A2," and "refrigerant composition A3" in this specification). The numerical ranges of refrigerant compositions A1 to A3 are all based on the total amount of difluoromethane, pentafluoroethane, and 1,1,1,2-tetrafluoroethane taken as 100 wt %.
Refrigerant Composition A1
Difluoromethane: 32.5 to 33.5 wt %
Pentafluoroethane: 14.3 to 16.0 wt %
1,1,1,2-Tetrafluoroethane: 50.5 to 53.2 wt %
Refrigerant Composition A2
Difluoromethane: 32.9 to 33.5 wt %
Pentafluoroethane: 14.4 to 16.0 wt %
1,1,1,2-Tetrafluoroethane: 50.5 to 52.7 wt %
Refrigerant Composition A3
Difluoromethane: 33.4 to 33.5 wt %
Pentafluoroethane: 14.6 to 16.0 wt %
1,1,1,2-Tetrafluoroethane: 50.5 to 52.0 wt %

When a refrigerant composition is transferred from a supply source to a supply destination, adjusting the proportions of the components in the liquid phase of the refrigerant composition in the supply source before transfer such that the proportions of the components fall within the range of refrigerant composition A1, A2, or A3 enables the proportions of the components in the liquid phase of the refrigerant composition in the supply source after transfer to fall within the range of tolerance A.

To transfer a refrigerant composition that falls within the range of tolerance B, one of the following three types of refrigerant compositions is used whose liquid phase is composed as described below (the three compositions are hereinafter referred to as "refrigerant composition B1," "refrigerant composition B2," and "refrigerant composition B3" in this specification). The numerical ranges of refrigerant compositions B1 to B3 are all based on the total amount of difluoromethane, pentafluoroethane, and 1,1,1,2-tetrafluoroethane taken as 100 wt %.
Refrigerant Composition B1
Difluoromethane: 29.7 to 31.0 wt %
Pentafluoroethane: 29.7 to 31.0 wt %
1,1,1,2-Tetrafluoroethane: 38.0 to 40.6 wt %
Refrigerant Composition B2
Difluoromethane: 29.9 to 31.0 wt %
Pentafluoroethane: 29.9 to 31.0 wt %
1,1,1,2-Tetrafluoroethane: 38.0 to 40.2 wt %
Refrigerant Composition B3
Difluoromethane: 30.3 to 31.0 wt %
Pentafluoroethane: 30.3 to 31.0 wt %
1,1,1,2-Tetrafluoroethane: 38.0 to 39.4 wt %

When a refrigerant composition is transferred from a supply source to a supply destination, adjusting the proportions of the components in the liquid phase of the refrigerant composition in the supply source before transfer such that the proportions of the components fall within the range of refrigerant composition B1, B2, or B3 enables the proportions of the components in the liquid phase of the refrigerant composition in the supply source after transfer to fall within the range of tolerance B.

To transfer a refrigerant composition that falls within the range of tolerance C, one of the following three types of refrigerant compositions is used whose liquid phase is composed as described below (the three compositions are hereinafter referred to as "refrigerant composition C1," "refrigerant composition C2," and "refrigerant composition C3" in this specification). The numerical ranges of refrigerant compositions C1 to C3 are all based on the total amount of difluoromethane, pentafluoroethane, and 1,1,1,2-tetrafluoroethane taken as 100 wt %.
Refrigerant Composition C1
Difluoromethane: 39.9 to 41.0 wt %
Pentafluoroethane: 29.3 to 31.0 wt %
1,1,1,2-Tetrafluoroethane: 28.0 to 30.8 wt %
Refrigerant Composition C2
Difluoromethane: 40.2 to 41.0 wt %
Pentafluoroethane: 29.5 to 31.0 wt %
1,1,1,2-tetrafluoroethane: 28.0 to 30.3 wt %
Refrigerant Composition C3
Difluoromethane: 40.7 to 41.0 wt %
Pentafluoroethane: 29.7 to 31.0 wt %
1,1,1,2-Tetrafluoroethane: 28.0 to 29.6 wt %

When a refrigerant composition is transferred from a supply source to a supply destination, adjusting the proportions of the components in the liquid phase of the refrigerant composition in the supply source before transfer such that the proportions of the components fall within the range of refrigerant composition C1, C2, or C3 enables the proportions of the components in the liquid phase of the refrigerant composition in the supply source after transfer to fall within the range of tolerance C.

To use a refrigerant composition that falls within the range of tolerance D, one of the following three types of refrigerant compositions is used whose liquid phase is composed as described below (the three compositions are hereinafter referred to as "refrigerant composition D1," "refrigerant composition D2," and "refrigerant composition D3" in this specification). The numerical ranges of refrigerant compositions D1 to D3 are all based on the total amount of difluoromethane, pentafluoroethane, and 1,1,1,2-tetrafluoroethane taken as 100 wt %.
Refrigerant Composition D1
Difluoromethane: 24.4 to 26.0 wt %
Pentafluoroethane: 14.9 to 16.0 wt %
1,1,1,2-Tetrafluoroethane: 58.0 to 60.7 wt %
Refrigerant Composition D2
Difluoromethane: 24.8 to 26.0 wt %
Pentafluoroethane: 14.9 to 16.0 wt %
1,1,1,2-Tetrafluoroethane: 58.0 to 60.3 wt %
Refrigerant Composition D3
Difluoromethane: 25.3 to 26.0 wt %
Pentafluoroethane: 15.1 to 16.0 wt %
1,1,1,2-Tetrafluoroethane: 58.0 to 59.6 wt %

When a refrigerant composition is transferred from a supply source to a supply destination, adjusting the proportions of the components in the liquid phase of the refrigerant composition in the supply source before the transfer such that the proportions of the components fall within the range of refrigerant composition D1, D2, or D3 enables the proportions of the components in the liquid phase of the refrigerant composition in the supply source after the transfer to fall within the range of tolerance D.

The method according to the present invention enables the proportions of the components in the liquid phase of the refrigerant composition in the supply source after the transfer to fall within the range of tolerance A to D by adjusting the proportions of the components in the liquid phase of the refrigerant composition in the supply source before the transfer such that the proportions of the components fall within the range of any of refrigerant compositions A1 to A3, B1 to B3, C1 to C3, and D1 to D3, even if the composition is transferred until the transfer rate calculated with the following equation is achieved. In other words, adjusting the proportions of the components in the liquid phase of the refrigerant composition in the supply source such that the proportions of the components fall within the range of any of refrigerant compositions A1 to A3, B1 to B3, C1 to C3, and D1 to D3 enables the proportions of the components in the liquid phase of the refrigerant composition in the supply source after the transfer to fall within the range of tolerance A to D, while enabling the transfer of the composition to the point at which the transfer rate calculated with the following equation is achieved.

Transfer Rate (%)=Mass of Refrigerant Transferred from Liquid Phase of Supply Source to Supply Destination/Mass of Refrigerant Transferred to Supply Destination×100

Specifically, even if the transfer is performed until the transfer rate reaches a maximum of 70%, adjusting the proportions of the components in the liquid phase of the refrigerant composition in the supply source before the transfer so as to fall within the range of refrigerant composition A1 enables the proportions of the components in the liquid phase of the refrigerant composition in the supply source after the transfer to fall within the range of tolerance A. Even if the transfer is performed until the transfer rate reaches a maximum of 80%, adjusting the proportions of the components in the liquid phase of the refrigerant composition in the supply source before the transfer so as to fall within the range of refrigerant composition A2 enables the proportions of the components in the liquid phase of the refrigerant composition in the supply source after the transfer to fall within the range of tolerance A. Even if the transfer is performed until the transfer rate reaches a maximum of 90%, adjusting the proportions of the components in the liquid phase of the refrigerant composition in the supply source before the transfer so as to fall within the range of refrigerant composition A3 enables the proportions of the components in the liquid phase of the refrigerant composition in the supply source after the transfer to fall within the range of tolerance A.

Even if the transfer is performed until the transfer rate reaches a maximum of 70%, adjusting the proportions of the components in the liquid phase of the refrigerant composition in the supply source before the transfer so as to fall within the range of refrigerant composition B1 enables the proportions of the components in the liquid phase of the refrigerant composition in the supply source after the transfer to fall within the range of tolerance B. Even if the transfer is performed until the transfer rate reaches a maximum of 80%, adjusting the proportions of the components in the liquid phase of the refrigerant composition in the supply source before the transfer so as to fall within the range of refrigerant composition B2 enables the proportions of the components in the liquid phase of the refrigerant composition in the supply source after the transfer to fall within the range of tolerance B. Even if the transfer is performed until the transfer rate reaches a maximum of 90%, adjusting the proportions of the components in the liquid phase of the refrigerant composition in the supply source before the transfer so as to fall within the range of refrigerant composition B3 enables the proportions of the components in the liquid phase of the refrigerant composition in the supply source after the transfer to fall within the range of tolerance B.

Even if the transfer is performed until the transfer rate reaches a maximum of 70%, adjusting the proportions of the components in the liquid phase of the refrigerant composition in the supply source before the transfer so as to fall within the range of refrigerant composition C1 enables the proportions of the components in the liquid phase of the refrigerant composition in the supply source after the transfer to fall within the range of tolerance C. Even if the transfer is performed until the transfer rate reaches a maximum of 80%, adjusting the proportions of the components in the liquid phase of the refrigerant composition in the supply source before the transfer so as to fall within the range of refrigerant composition C2 enables the proportions of the components in the liquid phase of the refrigerant composition in the supply source after the transfer to fall within the range of tolerance C. Even if the transfer is performed until the transfer rate reaches a maximum of 90%, adjusting the proportions of the components in the liquid phase of the refrigerant composition in the supply source before the transfer so as to fall within the range of refrigerant composition C3 enables the proportions of the components in the liquid phase of the refrigerant composition in the supply source after the transfer to fall within the range of tolerance C.

Even if the transfer is performed until the transfer rate reaches a maximum of 70%, adjusting the proportions of the components in the liquid phase of the refrigerant composition in the supply source before the transfer so as to fall within the range of refrigerant composition D1 enables the proportions of the components in the liquid phase of the refrigerant composition in the supply source after the transfer to fall within the range of tolerance D. Even if the transfer is performed until the transfer rate reaches a maximum of 80%, adjusting the proportions of the components in the liquid phase of the refrigerant composition in the supply source before the transfer so as to fall within the range of refrigerant composition D2 enables the proportions of the components in the liquid phase of the refrigerant composition in the supply source after the transfer to fall within the range of tolerance D. Even if the transfer is performed until the transfer rate reaches a maximum of 90%, adjusting the proportions of the components in the liquid phase of the refrigerant composition in the supply source before the transfer so as to fall within the range of refrigerant composition D3 enables the proportions of the components in the liquid phase of the refrigerant composition in the supply source after the transfer to fall within the range of tolerance D.

A preferable transfer rate varies, depending on the capacity and shape of the supply source, the way the supply source is used, etc. For example, when the supply source is a small airtight container, such as a can, an NRC container, or a rotary container (5 to 1000 L), full use of the refrigerant composition in the airtight container is typically assumed;

thus, when the composition is transferred until the transfer rate reaches about 90%, the proportions of the components in the liquid phase of the refrigerant composition in the supply source are preferably adjusted such that the proportions of the components of the refrigerant composition in the supply source after the transfer fall within the range of tolerance A to D.

For example, when the supply source is a large airtight container, such as an ISO container or a storage tank, a transfer operation is typically performed through pump circulation, and the supply source is replenished with additional refrigerant composition, with the liquid phase remaining in the supply source, in order to protect the equipment (pump). When a large amount of the liquid phase of the refrigerant composition remains, the compositional change of the liquid phase can be decreased; however, the step of replenishing the supply source with the refrigerant composition is performed in increased frequency, and this is not economical. Thus, even if the transfer from a supply source that is a large airtight container is performed until the transfer rate reaches about 70 to 90%, it is preferable to adjust the proportions of the components in the liquid phase of the refrigerant composition in the supply source such that the proportions of the components of the refrigerant composition in the supply source after the transfer fall within the ranges of tolerance A to D.

When the proportions of the components in the liquid phase of the refrigerant composition are adjusted such that the proportions of the components in the liquid phase of the refrigerant composition in the supply source after the transfer fall within the ranges of tolerance A to D for the case in which the composition is transferred until the transfer rate reaches 90%, the proportions of the components in the liquid phase of the refrigerant composition in the supply source after the transfer fall within the ranges of tolerance A to D, even when the composition is transferred until the transfer rate reaches less than 90% (e.g., 70 to 80%). However, this narrows the range of choice for the proportions of the components of the refrigerant composition in the supply source and requires tighter quality control; it is thus preferable to suitably determine the transfer rate, depending on the form of the supply source.

EXAMPLES

The following describes the present invention in more detail with reference to Examples. However, the present invention is not limited to the Examples.

Reference Example 1: Analysis of Compositional Change of Liquid Phase in Supply Source in Transferring R4070

Figure 2:
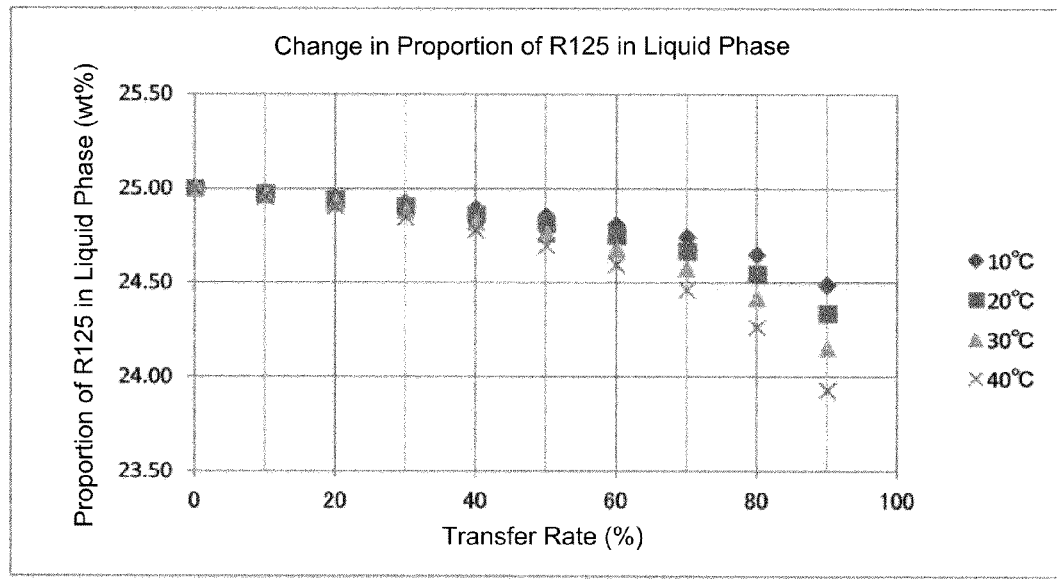
FIG. 2 is a chart illustrating the results of Reference Example 1 (a change in the proportion of pentafluoroethane in the liquid phase).
Figure 3:
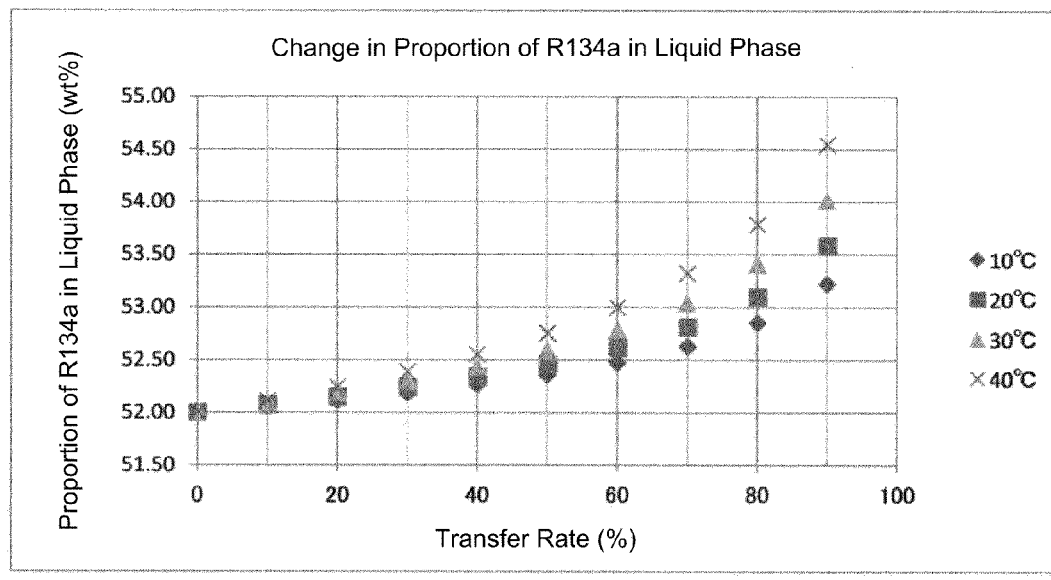
FIG. 3 is a chart illustrating the results of Reference Example 1 (a change in the proportion of 1,1,1,2-tetrafluoroethane in the liquid phase).

10-L airtight containers (supply source) were charged with 9 kg of a refrigerant composition (R4070) containing the following three components: 23.0 wt % of difluoromethane, 25.0 wt % of pentafluoroethane, and 52.0 wt % of 1,1,1,2-tetrafluoroethane. Subsequently, the liquid temperature of each supply source was adjusted to 10° C., 20° C., 30° C., or 40° C., and the refrigerant composition was transferred to respective airtight containers (supply destination) with a pump at a rate of 0.9 kg per minute until the transfer rate reached 90%. A portion of the transferred gas was taken from the sampling valve attached in the middle of the lead-out pipe in the liquid phase side at a point at which the transfer rate reached 0%, 10%, 20%, 30%, 40%, 50%, 60%, 70%, 80% and 90%, and the proportions of the components in the liquid phase were analyzed by gas chromatography. FIG. 1 illustrates changes in the proportion of difluoromethane in the liquid phase. FIG. 2 illustrates changes in the proportion of pentafluoroethane in the liquid phase. FIG. 3 illustrates changes in the proportion of 1,1,1,2-tetrafluoroethane in the liquid phase.

From FIGS. 1 to 3, the range of variation of the proportions of the components in the liquid phase of R407C was confirmed to increase as the transfer rate increased. The range of variation of the proportions of the components in the liquid phase was also confirmed to increase as the liquid temperature increased. Note that it is extremely difficult to predict, from the results of R407C used in Reference Example 1, the range of variation of the proportions of the components in the liquid phase of a refrigerant composition whose components are different in their proportions from the components of the composition used in Reference Example 1, even if both refrigerant compositions are formed of the same components, because these two compositions differ, for example, in the compositional ratio, the range of tolerance, and the transfer rate.

Reference Example 2: Analysis of Compositional Change of Liquid Phase in Supply Source in Transferring R407H 10-L airtight containers (containers as a supply source) were charged with 9 kg of a refrigerant composition (R407H) containing the following three components: 32.5 wt % of difluoromethane, 15.0 wt % of pentafluoroethane, and 52.5 wt % of 1,1,1,2-tetrafluoroethane. The range of tolerance of the refrigerant composition used in Reference Example 2 was as follows: 31.5 to 33.5 wt % for difluoromethane, 14.0 to 16.0 wt % for pentafluoroethane, and 50.5 to 54.5 wt % for 1,1,1,2-tetrafluoroethane (the range of tolerance A).

Subsequently, the liquid temperature of each container was adjusted to 40° C., and the refrigerant compositions were transferred to respective containers (supply destination) with a pump at a rate of 0.9 kg per minute until the transfer rate reached 90%. A portion of the transferred gas was taken from the sampling valve attached in the middle of the lead-out pipe in the liquid phase side at a point at which the transfer rate reached 0%, 10%, 20%, 30%, 40%, 50%, 60%, 70%, 80% and 90%, and the proportions of the components in the liquid phase were analyzed by gas chromatography.

Although handling a container at 40° C. or more is banned under the High Pressure Gas Safety Act in Japan, there is no such a standard outside Japan. Thus, the test was performed at a liquid temperature of 40° C. because the temperature at about 40° C. would be the severest condition for a transfer working environment.

Table 1 illustrates the results. The underlined values in Table 1 fall outside the range of tolerance A.

TABLE 1

| Transfer Rate | Proportions of Components of Liquid Phase in Supply Source (wt %) | | |
|---|---|---|---|
| (%) | R32 | R125 | R134a |
| 0 | 32.5 | 15.0 | 52.5 |
| 10 | 32.4 | 15.0 | 52.6 |
| 20 | 32.3 | 15.0 | 52.7 |
| 30 | 32.2 | 14.9 | 52.9 |
| 40 | 32.1 | 14.9 | 53.0 |

TABLE 1-continued

| Transfer Rate (%) | Proportions of Components of Liquid Phase in Supply Source (wt %) | | |
|---|---|---|---|
| | R32 | R125 | R134a |
| 50 | 31.9 | 14.8 | 53.3 |
| 60 | 31.8 | 14.7 | 53.5 |
| 70 | 31.5 | 14.7 | 53.8 |
| 80 | <u>31.2</u> | 14.6 | 54.3 |
| 90 | <u>30.6</u> | 14.4 | <u>55.0</u> |

Table 1 indicates regarding the refrigerant composition (R407H) used in Reference Example 2 that the proportions of the components of the refrigerant composition in the supply source fall within the range of tolerance A even when the composition was transferred until the transfer rate reached 70%. However, when the composition was transferred until the transfer rate reached 80%, the proportion of difluoromethane in the liquid phase fell outside the range of tolerance A. When the composition was transferred until the transfer rate reached 90%, the proportion of difluoromethane in the liquid phase and the proportion of 1,1,1,2-tetrafluoroethane in the liquid phase both fell outside the range of tolerance A.

Example 1-1: Derivation of Refrigerant Composition A1

An analysis was performed based on the results of Reference Example 2 to find the proportions of the components of R407H (refrigerant composition A1) whose components of the liquid phase in the supply source fall within the range of tolerance A (difluoromethane: 31.5 to 33.5 wt %, pentafluoroethane: 14.0 to 16.0 wt %, and 1,1,1,2-tetrafluoroethane: 50.5 to 54.5 wt %), even when R407H is transferred until the transfer rate reaches 70%.

Specifically, an analysis was performed in the same manner as in Reference Example 2 to find the lower limit and the upper limit of the proportions of the components with a low boiling point (difluoromethane and pentafluoroethane) before the transfer. The lower limit and the upper limit of the proportions of such components satisfy the following: the proportions of the components in the liquid phase of the refrigerant composition in the supply source fall within the range of tolerance A, even when R407H is transferred until the transfer rate reaches 70%. Table 2 and Table 3 illustrate the results (Table 2: the results of analysis of the lower limit of the proportions of components with a low boiling point, Table 3: the results of analysis of the upper limit of the proportions of components with a low boiling point).

TABLE 2

| Transfer Rate (%) | Proportions of Components of Liquid Phase in Supply Source (wt %) | | |
|---|---|---|---|
| | R32 | R125 | R134a |
| 0 | 32.5 | 14.3 | 53.2 |
| 10 | 32.4 | 14.3 | 53.3 |
| 20 | 32.3 | 14.2 | 53.4 |
| 30 | 32.2 | 14.2 | 53.6 |
| 40 | 32.1 | 14.2 | 53.7 |
| 50 | 31.9 | 14.1 | 54.0 |
| 60 | 31.7 | 14.1 | 54.2 |
| 70 | 31.5 | 14.0 | 54.5 |

TABLE 3

| Transfer Rate (%) | Proportions of Components of Liquid Phase in Supply Source (wt %) | | |
|---|---|---|---|
| | R32 | R125 | R134a |
| 0 | 33.5 | 16.0 | 50.5 |
| 10 | 33.4 | 16.0 | 50.6 |
| 20 | 33.3 | 15.9 | 50.8 |
| 30 | 33.2 | 15.9 | 50.9 |
| 40 | 33.1 | 15.9 | 51.0 |
| 50 | 32.9 | 15.8 | 51.3 |
| 60 | 32.8 | 15.7 | 51.5 |
| 70 | 32.5 | 15.7 | 51.8 |

Tables 2 and 3 indicate that the proportions of the components in the liquid phase of the refrigerant composition in the supply source fall within the range of tolerance A under the conditions of a transfer rate at up to 70%, when the proportions of the components are as follows: difluoromethane 32.5 to 33.5 wt %, pentafluoroethane 14.3 to 16.0 wt %, and 1,1,1,2-tetrafluoroethane 50.5 to 53.2 wt % (refrigerant composition A1).

Example 1-2: Derivation of Refrigerant Composition A2

An analysis was performed based on the results of Reference Example 2 to find the proportions of the components of R407H (refrigerant composition A2) whose components of the liquid phase in the supply source fall within the range of tolerance A (difluoromethane: 31.5 to 33.5 wt %, pentafluoroethane: 14.0 to 16.0 wt %, and 1,1,1,2-tetrafluoroethane: 50.5 to 54.5 wt %), even when R407H is transferred until the transfer rate reaches 80%.

Specifically, an analysis was performed in the same manner as in Reference Example 2 to find the lower limit and the upper limit of the proportions of the components with a low boiling point (difluoromethane and pentafluoroethane) before the transfer. The lower limit and the upper limit of the proportions of such components satisfy the following: the proportions of the components in the liquid phase of the refrigerant composition in the supply source fall within the range of tolerance A, even when the refrigerant composition is transferred until the transfer rate reaches 80%. Table 4 and Table 5 illustrate the results (Table 4: the results of analysis of the lower limit of the proportions of components with a low boiling point, Table 5: the results of analysis of the upper limit of the proportions of components with a low boiling point).

TABLE 4

| Transfer Rate (%) | Proportions of Components of Liquid Phase in Supply Source (wt %) | | |
|---|---|---|---|
| | R32 | R125 | R134a |
| 0 | 32.9 | 14.4 | 52.7 |
| 10 | 32.8 | 14.4 | 52.8 |
| 20 | 32.7 | 14.4 | 52.9 |
| 30 | 32.6 | 14.3 | 53.1 |
| 40 | 32.5 | 14.3 | 53.2 |
| 50 | 32.3 | 14.2 | 53.5 |
| 60 | 32.1 | 14.2 | 53.7 |
| 70 | 31.9 | 14.1 | 54.0 |
| 80 | 31.5 | 14.0 | 54.5 |

TABLE 5

| Transfer Rate | Proportions of Components of Liquid Phase in Supply Source (wt %) | | |
|---|---|---|---|
| (%) | R32 | R125 | R134a |
| 0 | 33.5 | 16.0 | 50.5 |
| 10 | 33.4 | 16.0 | 50.6 |
| 20 | 33.3 | 15.9 | 50.8 |
| 30 | 33.2 | 15.9 | 50.9 |
| 40 | 33.1 | 15.9 | 51.0 |
| 50 | 32.9 | 15.8 | 51.3 |
| 60 | 32.8 | 15.7 | 51.5 |
| 70 | 32.5 | 15.7 | 51.8 |
| 80 | 32.2 | 15.5 | 52.3 |

Tables 4 and 5 indicate that the proportions of the components in the liquid phase of the refrigerant composition in the supply source fall within the range of tolerance A under the conditions of a transfer rate at up to 80%, when the proportions of the components are as follows: difluoromethane 32.9 to 33.5 wt %, pentafluoroethane 14.4 to 16.0 wt %, and 1,1,1,2-tetrafluoroethane 50.5 to 52.7 wt % (refrigerant composition A2).

Example 1-2: Derivation of Refrigerant Composition A3

An analysis was performed based on the results of Reference Example 2 to find the proportions of the components of R407H (refrigerant composition A3) whose components of the liquid phase in the supply source fall within the range of tolerance A (difluoromethane: 31.5 to 33.5 wt %, pentafluoroethane: 14.0 to 16.0 wt %, and 1,1,1,2-tetrafluoroethane: 50.5 to 54.5 wt %), even when R407H is transferred until the transfer rate reaches 90%.

Specifically, an analysis was performed in the same manner as in Reference Example 2 to find the lower limit and the upper limit of the proportions of the components with a low boiling point (difluoromethane and pentafluoroethane) before the transfer. The lower limit and the upper limit of the proportions of such components satisfy the following: the proportions of the components of the liquid phase of the refrigerant composition in the supply source fall within the range of tolerance A, even when the refrigerant composition is transferred until the transfer rate reaches 90%. Table 6 and Table 7 illustrate the results (Table 6: the results of analysis of the lower limit of the proportions of components with a low boiling point, Table 7: the results of analysis of the upper limit of the proportions of components with a low boiling point).

TABLE 6

| Transfer Rate | Proportions of Components of Liquid Phase in Supply Source (wt %) | | |
|---|---|---|---|
| (%) | R32 | R125 | R134a |
| 0 | 33.4 | 14.6 | 52.0 |
| 10 | 33.3 | 14.6 | 52.1 |
| 20 | 33.2 | 14.6 | 52.2 |
| 30 | 33.1 | 14.5 | 52.4 |
| 40 | 33.0 | 14.5 | 52.5 |
| 50 | 32.8 | 14.4 | 52.8 |
| 60 | 32.6 | 14.4 | 53.0 |
| 70 | 32.4 | 14.3 | 53.3 |
| 80 | 32.0 | 14.2 | 53.8 |
| 90 | 31.5 | 14.0 | 54.5 |

TABLE 7

| Transfer Rate | Proportions of Components of Liquid Phase in Supply Source (wt %) | | |
|---|---|---|---|
| (%) | R32 | R125 | R134a |
| 0 | 33.5 | 16.0 | 50.5 |
| 10 | 33.4 | 16.0 | 50.6 |
| 20 | 33.3 | 15.9 | 50.8 |
| 30 | 33.2 | 15.9 | 50.9 |
| 40 | 33.1 | 15.9 | 51.0 |
| 50 | 32.9 | 15.8 | 51.3 |
| 60 | 32.8 | 15.7 | 51.5 |
| 70 | 32.5 | 15.7 | 51.8 |
| 80 | 32.2 | 15.5 | 52.3 |
| 90 | 31.6 | 15.3 | 53.1 |

Tables 6 and 7 indicate that the proportions of the components in the liquid phase of the refrigerant composition in the supply source fall within the range of tolerance A under the conditions of a transfer rate at up to 90%, when the proportions of the components are as follows: difluoromethane 33.4 to 33.5 wt %, pentafluoroethane 14.6 to 16.0 wt %, and 1,1,1,2-tetrafluoroethane 50.5 to 52.0 wt % (refrigerant composition A3).

Reference Example 3: Analysis of Compositional Change of Liquid Phase in Supply Source in Transferring R407F A test was performed in the same manner as in Reference Example 2, except that 10-L airtight containers (containers as a supply source) were charged with 9 kg of a refrigerant composition (R407F) containing the following three components: 30.0 wt % of difluoromethane, 30.0 wt % of pentafluoroethane, and 40.0 wt % of 1,1,1,2-tetrafluoroethane. The range of tolerance for the refrigerant composition applied in Reference Example 3 is as follows: 28.0 to 32.0 wt % for difluoromethane, 28.0 to 32.0 wt % for pentafluoroethane, and 38.0 to 42.0 wt % for 1,1,1,2-tetrafluoroethane (range of tolerance B). Table 8 illustrates the results. The underlined value in Table 8 falls outside the range of tolerance B.

TABLE 8

| Transfer Rate | Proportions of Components of Liquid Phase in Supply Source (wt %) | | |
|---|---|---|---|
| (%) | R32 | R125 | R134a |
| 0 | 30.0 | 30.0 | 40.0 |
| 10 | 29.9 | 30.0 | 40.1 |
| 20 | 29.9 | 30.0 | 40.1 |
| 30 | 29.7 | 29.9 | 40.4 |
| 40 | 29.7 | 29.8 | 40.5 |
| 50 | 29.5 | 29.7 | 40.8 |
| 60 | 29.4 | 29.6 | 41.0 |
| 70 | 29.2 | 29.5 | 41.3 |
| 80 | 28.9 | 29.3 | 41.8 |
| 90 | 28.4 | 29.0 | <u>42.6</u> |

Table 8 indicates that the proportions of the components in the liquid phase of the refrigerant composition (R407F) used in Reference Example 3 in the supply source fall within the range of tolerance B, under the conditions of a transfer rate at up to 80%. However, when R407F was transferred until the transfer rate reached 90%, the proportion of 1,1,1, 2-tetrafluoroethane fell outside the range of tolerance B.

Example 2-1: Derivation of Refrigerant Composition B1

An analysis was performed based on the results of Reference Example 3 to find the proportions of the components of R407F (refrigerant composition B1) whose components of the liquid phase in the supply source fall within the range of tolerance B (difluoromethane: 28.0 to 32.0 wt %, pentafluoroethane: 28.0 to 32.0 wt %, and 1,1,1,2-tetrafluoroethane: 38.0 to 42.0 wt %), even when R407F is transferred until the transfer rate reaches 70%.

Specifically, an analysis was performed in the same manner as in Reference Example 3 to find the lower limit and the upper limit of the proportions of the components with a low boiling point (difluoromethane and pentafluoroethane) before transfer. The lower limit and the upper limit of the proportions of such components satisfy the following: the proportions of the components in the liquid phase of the refrigerant composition in the supply source fall within the range of tolerance B, even when R407F is transferred until the transfer rate reaches 70%. Table 9 and Table 10 illustrate the results (Table 9: the results of analysis of the lower limit of the proportions of components with a low boiling point, Table 10: the results of analysis of the upper limit of the proportions of components with a low boiling point).

TABLE 9

| Transfer Rate | Proportions of Components of Liquid Phase in Supply Source (wt %) | | |
|---|---|---|---|
| (%) | R32 | R125 | R134a |
| 0 | 29.7 | 29.7 | 40.6 |
| 10 | 29.6 | 29.7 | 40.7 |
| 20 | 29.6 | 29.6 | 40.8 |
| 30 | 29.4 | 29.6 | 41.0 |
| 40 | 29.4 | 29.5 | 41.1 |
| 50 | 29.2 | 29.4 | 41.4 |
| 60 | 29.1 | 29.3 | 41.6 |
| 70 | 28.9 | 29.1 | 42.0 |

TABLE 10

| Transfer Rate | Proportions of Components of Liquid Phase in Supply Source (wt %) | | |
|---|---|---|---|
| (%) | R32 | R125 | R134a |
| 0 | 31.0 | 31.0 | 38.0 |
| 10 | 30.9 | 31.0 | 38.1 |
| 20 | 30.9 | 30.9 | 38.2 |
| 30 | 30.7 | 30.9 | 38.4 |
| 40 | 30.7 | 30.8 | 38.5 |
| 50 | 30.5 | 30.8 | 38.7 |
| 60 | 30.4 | 30.6 | 39.0 |
| 70 | 30.2 | 30.5 | 39.3 |

Tables 9 and 10 indicate that the proportions of the components in the liquid phase of the refrigerant composition in the supply source fall within the range of tolerance B, under the conditions of a transfer rate at up to 70%, when the proportions of the components are as follows: difluoromethane 29.7 to 31.0 wt %, pentafluoroethane 29.7 to 31.0 wt %, and 1,1,1,2-tetrafluoroethane 38.0 to 40.6 wt % (refrigerant composition B1).

Example 2-2: Derivation of Refrigerant Composition B2

An analysis was performed based on the results of Reference Example 3 to find the proportions of the components of R407F (refrigerant composition B2) whose proportions of the components of the liquid phase in the supply source fall within the range of tolerance B (difluoromethane: 28.0 to 32.0 wt %, pentafluoroethane: 28.0 to 32.0 wt %, and 1,1,1,2-tetrafluoroethane: 38.0 to 42.0 wt %), even when R407F is transferred until the transfer rate reaches 80%.

Specifically, an analysis was performed in the same manner as in Reference Example 3 to find the lower limit and the upper limit of the proportions of the components with a low boiling point (difluoromethane and pentafluoroethane) before the transfer. The lower limit and the upper limit of the proportions of such components satisfy the following: the proportions of the components in the liquid phase of the refrigerant composition in the supply source fall within the range of tolerance B, even when R407F is transferred until the transfer rate reaches 80%. Table 11 and Table 12 illustrate the results (Table 11: the results of analysis of the lower limit of the proportions of components with a low boiling point, Table 12: the results of analysis of the upper limit of the proportions of components with a low boiling point).

TABLE 11

| Transfer Rate | Proportions of Components of Liquid Phase in Supply Source (wt %) | | |
|---|---|---|---|
| (%) | R32 | R125 | R134a |
| 0 | 29.9 | 29.9 | 40.2 |
| 10 | 29.8 | 29.9 | 40.3 |
| 20 | 29.8 | 29.8 | 40.4 |
| 30 | 29.6 | 29.8 | 40.6 |
| 40 | 29.6 | 29.7 | 40.7 |
| 50 | 29.4 | 29.6 | 41.0 |
| 60 | 29.3 | 29.5 | 41.2 |
| 70 | 29.1 | 29.4 | 41.5 |
| 80 | 28.8 | 29.2 | 42.0 |

TABLE 12

| Transfer Rate | Proportions of Components of Liquid Phase in Supply Source (wt %) | | |
|---|---|---|---|
| (%) | R32 | R125 | R134a |
| 0 | 31.0 | 31.0 | 38.0 |
| 10 | 30.9 | 31.0 | 38.1 |
| 20 | 30.9 | 30.9 | 38.2 |
| 30 | 30.7 | 30.9 | 38.4 |
| 40 | 30.7 | 30.8 | 38.5 |
| 50 | 30.5 | 30.8 | 38.7 |
| 60 | 30.4 | 30.6 | 39.0 |
| 70 | 30.2 | 30.5 | 39.3 |
| 80 | 29.9 | 30.3 | 39.8 |

Tables 11 and 12 indicate that the proportions of the components in the liquid phase of the refrigerant composition in the supply source fall within the range of tolerance B, under the conditions of a transfer rate at up to 80%, when the proportions of the components are as follows: difluoromethane 29.9 to 31.0 wt %, pentafluoroethane 29.9 to 31.0 wt %, and 1,1,1,2-tetrafluoroethane 38.0 to 40.2 wt % (refrigerant composition B2).

Example 2-3: Derivation of Refrigerant Composition B3

An analysis was performed based on the results of Reference Example 3 to find the proportions of the components of R407F (refrigerant composition B2) whose proportions of the components of the liquid phase in the supply source fall within the range of tolerance B (difluoromethane: 28.0 to 32.0 wt %, pentafluoroethane: 28.0 to 32.0 wt %, and 1,1,1,2-tetrafluoroethane: 38.0 to 42.0 wt %), even when R407F is transferred until the transfer rate reaches 90%.

Specifically, an analysis was performed in the same manner as in Reference Example 3 to find the lower limit and the upper limit of the proportions of the components with a low boiling point (difluoromethane and pentafluoroethane) before the transfer. The lower limit and the upper limit of the proportions of such components satisfy the following: the proportions of the components in the liquid phase of the refrigerant composition in the supply source fall within the range of tolerance B, even when R407F is transferred until the transfer rate reaches 90%. Table 13 and Table 14 illustrate the results (Table 13: the results of analysis of the lower limit of the proportions of components with a low boiling point, Table 14: the results of analysis of the upper limit of the proportions of components with a low boiling point).

TABLE 13

| Transfer Rate | Proportions of Components of Liquid Phase in Supply Source (wt %) | | |
|---|---|---|---|
| (%) | R32 | R125 | R134a |
| 0 | 30.3 | 30.3 | 39.4 |
| 10 | 30.2 | 30.3 | 39.5 |
| 20 | 30.2 | 30.2 | 39.6 |
| 30 | 30.0 | 30.2 | 39.8 |
| 40 | 30.0 | 30.1 | 39.9 |
| 50 | 29.8 | 30.0 | 40.2 |
| 60 | 29.7 | 29.9 | 40.4 |
| 70 | 29.5 | 29.8 | 40.7 |
| 80 | 29.2 | 29.6 | 41.2 |
| 90 | 28.7 | 29.3 | 42.0 |

TABLE 14

| Transfer Rate | Proportions of Components of Liquid Phase in Supply Source (wt %) | | |
|---|---|---|---|
| (%) | R32 | R125 | R134a |
| 0 | 31.0 | 31.0 | 38.0 |
| 10 | 30.9 | 31.0 | 38.1 |
| 20 | 30.9 | 30.9 | 38.2 |
| 30 | 30.7 | 30.9 | 38.4 |
| 40 | 30.7 | 30.8 | 38.5 |
| 50 | 30.5 | 30.8 | 38.7 |
| 60 | 30.4 | 30.6 | 39.0 |
| 70 | 30.2 | 30.5 | 39.3 |
| 80 | 29.9 | 30.3 | 39.8 |
| 90 | 29.4 | 30.0 | 40.6 |

Tables 13 and 14 indicate that the proportions of the components in the liquid phase of the refrigerant composition in the supply source fall within the range of tolerance B, under the conditions of a transfer rate at up to 90%, when the proportions of the components are as follows: difluoromethane 30.3 to 31.0 wt %, pentafluoroethane 30.3 to 31.0 wt %, and 1,1,1,2-tetrafluoroethane 38.0 to 39.4 wt % (refrigerant composition B3).

Reference Example 4: Analysis of Compositional Change of Liquid Phase in Supply Source in Transferring D407HT A test was performed in the same manner as in Reference Example 2, except that 10-L airtight containers (containers as a supply source) were charged with 9 kg of a refrigerant composition (D407HT) containing the following three components: 40.0 wt % of difluoromethane, 30.0 wt % of pentafluoroethane, and 30.0 wt % of 1,1,1,2-tetrafluoroethane. The range of tolerance for the refrigerant composition applied in Reference Example 4 is as follows: 39.0 to 41.0 wt % for difluoromethane, 29.0 to 31.0 wt % for pentafluoroethane, and 28.0 to 32.0 wt % for 1,1,1,2-tetrafluoroethane (range of tolerance C). Table 15 illustrates the results. The underlined values in Table 15 fall outside the range of tolerance C.

TABLE 15

| Transfer Rate | Proportions of Components of Liquid Phase in Supply Source (wt %) | | |
|---|---|---|---|
| (%) | R32 | R125 | R134a |
| 0 | 40.0 | 30.0 | 30.0 |
| 10 | 39.9 | 30.0 | 30.1 |
| 20 | 39.9 | 29.9 | 30.2 |
| 30 | 39.8 | 29.9 | 30.3 |
| 40 | 39.6 | 29.9 | 30.5 |
| 50 | 39.5 | 29.8 | 30.7 |
| 60 | 39.4 | 29.7 | 30.9 |
| 70 | 39.1 | 29.7 | 31.2 |
| 80 | <u>38.9</u> | 29.5 | 31.6 |
| 90 | <u>38.3</u> | 29.3 | <u>32.4</u> |

Table 15 indicates regarding the refrigerant composition (D407HT) used in Reference Example 4 that the proportions of the components in the liquid phase of the refrigerant composition in the supply source fall within the range of tolerance C, when the composition was transferred until the transfer rate reached 70%. However, when the composition was transferred until the transfer rate reached 80%, the proportion of difluoromethane in the liquid phase fell outside the range of tolerance C. When the composition was transferred until the transfer rate reached 90%, the proportion of difluoromethane in the liquid phase and the proportion of 1,1,1,2-tetrafluoroethane in the liquid phase both fell outside the range of tolerance C.

Example 3-1: Derivation of Refrigerant Composition C1

An analysis was performed based on the results of Reference Example 4 to find the proportions of the components of D407HT (refrigerant composition C1) whose components of the liquid phase in the supply source fall within the range of tolerance C (difluoromethane: 39.0 to 41.0 wt %, pentafluoroethane: 29.0 to 31.0 wt %, and 1,1,1,2-tetrafluoroethane: 28.0 to 32.0 wt %), even when D407HT is transferred until the transfer rate reaches 70%.

Specifically, an analysis was performed in the same manner as in Reference Example 4 to find the lower limit and the upper limit of the proportions of the components with a low boiling point (difluoromethane and pentafluoroethane) before the transfer. The lower limit and the upper limit of the proportions of such components satisfy the following: the proportions of the components in the liquid phase of the refrigerant composition in the supply source fall within the range of tolerance C, even when D407HT is transferred until the transfer rate reaches 70%. Table 16 and Table 17 illustrate the results (Table 16: the results of analysis of the lower limit of the proportions of components with a low boiling point, Table 17: the results of analysis of the upper limit of the proportions of components with a low boiling point).

TABLE 16

| Transfer Rate | Proportions of Components of Liquid Phase in Supply Source (wt %) | | |
|---|---|---|---|
| (%) | R32 | R125 | R134a |
| 0 | 39.9 | 29.3 | 30.8 |
| 10 | 39.8 | 29.3 | 30.9 |
| 20 | 39.8 | 29.2 | 31.0 |
| 30 | 39.7 | 29.2 | 31.1 |
| 40 | 39.5 | 29.2 | 31.3 |
| 50 | 39.4 | 29.1 | 31.5 |
| 60 | 39.3 | 29.0 | 31.7 |
| 70 | 39.0 | 29.0 | 32.0 |

TABLE 17

| Transfer Rate | Proportions of Components of Liquid Phase in Supply Source (wt %) | | |
|---|---|---|---|
| (%) | R32 | R125 | R134a |
| 0 | 41.0 | 31.0 | 28.0 |
| 10 | 40.9 | 31.0 | 28.1 |
| 20 | 40.9 | 30.9 | 28.2 |
| 30 | 40.8 | 30.9 | 28.3 |
| 40 | 40.6 | 30.9 | 28.5 |
| 50 | 40.5 | 30.8 | 28.7 |
| 60 | 40.4 | 30.8 | 28.8 |
| 70 | 40.2 | 30.7 | 29.0 |

Tables 16 and 17 indicate that the proportions of the components in the liquid phase of the refrigerant composition in the supply source fall within the range of tolerance C, under the conditions of a transfer rate at up to 70%, when the proportions of the components are as follows: difluoromethane 39.9 to 41.0 wt %, pentafluoroethane 29.3 to 31.0 wt %, and 1,1,1,2-tetrafluoroethane 28.0 to 30.8 wt % (refrigerant composition C1).

Example 3-2: Derivation of Refrigerant Composition C2

An analysis was performed based on the results of Reference Example 4 to find the proportions of the components of D407HT (refrigerant composition C2) whose components of the liquid phase in the supply source fall within the range of tolerance C (difluoromethane: 39.0 to 41.0 wt %, pentafluoroethane: 29.0 to 31.0 wt %, and 1,1,1,2-tetrafluoroethane: 28.0 to 32.0 wt), even when D407HT is transferred until the transfer rate reaches 80%.

Specifically, an analysis was performed in the same manner as in Reference Example 4 to find the lower limit and the upper limit of the proportions of the components with a low boiling point (difluoromethane and pentafluoroethane) before transfer. The lower limit and the upper limit of the proportions of such components satisfy the following: the proportions of the components in the liquid phase of the refrigerant composition in the supply source fall within the range of tolerance C, even when D407HT is transferred until the transfer rate reaches 80%. Table 18 and Table 19 illustrate the results (Table 18: the results of analysis of the lower limit of the proportions of components with a low boiling point, Table 19: the results of analysis of the upper limit of the proportions of components with a low boiling point).

TABLE 18

| Transfer Rate | Proportions of Components of Liquid Phase in Supply Source (wt %) | | |
|---|---|---|---|
| (%) | R32 | R125 | R134a |
| 0 | 40.2 | 29.5 | 30.3 |
| 10 | 40.1 | 29.5 | 30.4 |
| 20 | 40.1 | 29.4 | 30.5 |
| 30 | 40.0 | 29.4 | 30.6 |
| 40 | 39.8 | 29.4 | 30.8 |
| 50 | 39.7 | 29.3 | 31.0 |
| 60 | 39.6 | 29.2 | 31.2 |
| 70 | 39.3 | 29.2 | 31.5 |
| 80 | 39.0 | 29.0 | 32.0 |

TABLE 19

| Transfer Rate | Proportions of Components of Liquid Phase in Supply Source (wt %) | | |
|---|---|---|---|
| (%) | R32 | R125 | R134a |
| 0 | 41.0 | 31.0 | 28.0 |
| 10 | 40.9 | 31.0 | 28.1 |
| 20 | 40.9 | 30.9 | 28.2 |
| 30 | 40.8 | 30.9 | 28.3 |
| 40 | 40.6 | 30.9 | 28.5 |
| 50 | 40.5 | 30.8 | 28.7 |
| 60 | 40.4 | 30.8 | 28.8 |
| 70 | 40.2 | 30.7 | 29.1 |
| 80 | 39.9 | 30.5 | 29.6 |

Tables 18 and 19 indicate that the proportions of the components in the liquid phase of the refrigerant composition in the supply source fall within the range of tolerance C, under the conditions of a transfer rate at up to 80%, when the proportions of the components are as follows: difluoromethane 40.2 to 41.0 wt %, pentafluoroethane 29.5 to 31.0 wt %, and 1,1,1,2-tetrafluoroethane 28.0 to 30.3 wt % (refrigerant composition C2).

Example 3-3: Derivation of Refrigerant Composition C3

An analysis was performed based on the results of Reference Example 4 to find the proportions of the components of D407HT (refrigerant composition C3) whose components of the liquid phase in the supply source fall within the range of tolerance C (difluoromethane: 39.0 to 41.0 wt %, pentafluoroethane: 29.0 to 31.0 wt %, and 1,1,1,2-tetrafluoroethane: 28.0 to 32.0 wt %), even when D407HT is transferred until the transfer rate reaches 90%.

Specifically, an analysis was performed in the same manner as in Reference Example 4 to find the lower limit and the upper limit of the proportions of the components with a low boiling point (difluoromethane and pentafluoroethane) before the transfer. The lower limit and the upper limit of the proportions of such components satisfy the following: the proportions of the components in the liquid phase of the refrigerant composition in the supply source fall within the range of tolerance C, even when D407HT is transferred until the transfer rate reaches 90%. Table 20 and Table 21 illustrate the results (Table 20: the results of analysis of the lower limit of the proportions of components with a low boiling point, Table 21: the results of analysis of the upper limit of the proportions of components with a low boiling point).

TABLE 20

| Transfer Rate | Proportions of Components of Liquid Phase in Supply Source (wt %) | | |
|---|---|---|---|
| (%) | R32 | R125 | R134a |
| 0 | 40.7 | 29.7 | 29.6 |
| 10 | 40.6 | 29.7 | 29.7 |
| 20 | 40.6 | 29.6 | 29.8 |
| 30 | 40.5 | 29.6 | 29.9 |
| 40 | 40.3 | 29.6 | 30.1 |
| 50 | 40.2 | 29.5 | 30.3 |
| 60 | 40.1 | 29.4 | 30.5 |
| 70 | 39.8 | 29.4 | 30.8 |
| 80 | 39.5 | 29.3 | 31.2 |
| 90 | 39.0 | 29.0 | 32.0 |

TABLE 21

| Transfer Rate | Proportions of Components of Liquid Phase in Supply Source (wt %) | | |
|---|---|---|---|
| (%) | R32 | R125 | R134a |
| 0 | 41.0 | 31.0 | 28.0 |
| 10 | 40.9 | 31.0 | 28.1 |
| 20 | 40.9 | 30.9 | 28.2 |
| 30 | 40.8 | 30.9 | 28.3 |
| 40 | 40.6 | 30.9 | 28.5 |
| 50 | 40.5 | 30.8 | 28.7 |
| 60 | 40.4 | 30.8 | 28.8 |
| 70 | 40.2 | 30.7 | 29.1 |
| 80 | 39.9 | 30.5 | 29.6 |
| 90 | 39.3 | 30.3 | 30.4 |

Tables 20 and 21 indicate that the proportions of the components in the liquid phase of the refrigerant composition in the supply source fall within the range of tolerance C, under the conditions of a transfer rate at up to 90%, when the proportions of the components are as follows: difluoromethane 40.7 to 41.0 wt %, pentafluoroethane 29.7 to 31.0 wt %, and 1,1,1,2-tetrafluoroethane 28.0 to 29.6 wt % (refrigerant composition C3).

Reference Example 5: Analysis of Compositional Change of Liquid Phase in Supply Source in Transferring R407E A test was performed in the same manner as in Reference Example 2, except that 10-L airtight containers (containers as a supply source) were charged with 9 kg of a refrigerant composition (R407E) containing the following three components: 25.0 wt % of difluoromethane, 15.0 wt % of pentafluoroethane, and 60.0 wt % of 1,1,1,2-tetrafluoroethane. The range of tolerance of the refrigerant composition applied in Reference Example 5 is as follows: 23.0 to 27.0 wt % for difluoromethane, 13.0 to 17.0 wt % for pentafluoroethane, and 58.0 to 62.0 wt % for 1,1,1,2-tetrafluoroethane (the range of tolerance D). Table 22 illustrates the results. The underlined value in Table 22 falls outside the range of tolerance D.

TABLE 22

| Transfer Rate | Proportions of Components of Liquid Phase in Supply Source (wt %) | | |
|---|---|---|---|
| (%) | R32 | R125 | R134a |
| 0 | 25.0 | 15.0 | 60.0 |
| 10 | 24.9 | 15.0 | 60.1 |

TABLE 22-continued

| Transfer Rate | Proportions of Components of Liquid Phase in Supply Source (wt %) | | |
|---|---|---|---|
| (%) | R32 | R125 | R134a |
| 20 | 24.7 | 14.9 | 60.2 |
| 30 | 24.7 | 14.9 | 60.4 |
| 40 | 24.6 | 14.9 | 60.5 |
| 50 | 24.5 | 14.8 | 60.7 |
| 60 | 24.3 | 14.7 | 61.0 |
| 70 | 24.1 | 14.6 | 61.3 |
| 80 | 23.8 | 14.5 | 61.7 |
| 90 | 23.3 | 14.3 | <u>62.4</u> |

Table 22 indicates regarding the refrigerant composition (R407E) used in Reference Example 5 that the proportions of the components in the liquid phase of the refrigerant composition in the supply source fall within the range of tolerance D, under the conditions of a transfer rate at up to 80%. However, when the composition was transferred until the transfer rate reached 90%, the proportion of 1,1,1,2-tetrafluoroethane in the liquid phase fell outside the range of tolerance D.

Example 4-1: Derivation of Refrigerant Composition D1

An analysis was performed based on the results of Reference Example 5 to find the proportions of the components of R407E (refrigerant composition D1) whose components of the liquid phase in the supply source fall within the range of tolerance D (difluoromethane: 23.0 to 27.0 wt %, pentafluoroethane: 13.0 to 17.0 wt %, and 1,1,1,2-tetrafluoroethane: 58.0 to 62.0 wt %), even when R407E is transferred until the transfer rate reaches 70%.

Specifically, an analysis was performed in the same manner as in Reference Example 5 to find the lower limit and the upper limit of the proportions of the components with a low boiling point (difluoromethane and pentafluoroethane) before the transfer. The lower limit and the upper limit of the proportions of such components satisfy the following: the proportions of the components in the liquid phase of the refrigerant composition in the supply source fall within the range of tolerance D, even when R407E is transferred until the transfer rate reaches 70%. Table 23 and Table 24 illustrate the results (Table 23: the results of analysis of the lower limit of the proportions of components with a low boiling point, Table 24: the results of analysis of the upper limit of the proportions of components with a low boiling point).

TABLE 23

| Transfer Rate | Proportions of Components of Liquid Phase in Supply Source (wt %) | | |
|---|---|---|---|
| (%) | R32 | R125 | R134a |
| 0 | 24.4 | 14.9 | 60.7 |
| 10 | 24.3 | 14.8 | 60.9 |
| 20 | 24.2 | 14.8 | 61.0 |
| 30 | 24.1 | 14.8 | 61.1 |
| 40 | 24.0 | 14.7 | 61.3 |
| 50 | 23.9 | 14.7 | 61.4 |
| 60 | 23.7 | 14.6 | 61.7 |
| 70 | 23.5 | 14.5 | 62.0 |

TABLE 24

| Transfer Rate (%) | Proportions of Components of Liquid Phase in Supply Source (wt %) | | |
|---|---|---|---|
| | R32 | R125 | R134a |
| 0 | 26.0 | 16.0 | 58.0 |
| 10 | 25.9 | 16.0 | 58.1 |
| 20 | 25.9 | 15.9 | 58.2 |
| 30 | 25.7 | 15.9 | 58.4 |
| 40 | 25.6 | 15.9 | 58.5 |
| 50 | 25.5 | 15.8 | 58.7 |
| 60 | 25.3 | 15.7 | 59.0 |
| 70 | 25.1 | 15.6 | 59.3 |

Tables 23 and 24 indicate that the proportions of the components in the liquid phase of the refrigerant composition in the supply source fall within the range of tolerance D, under the conditions of a transfer rate at up to 70%, when the proportions of the components are as follows: difluoromethane 24.4 to 26.0 wt %, pentafluoroethane 14.9 to 16.0 wt %, and 1,1,1,2-tetrafluoroethane 58.0 to 60.7 wt % (refrigerant composition D1).

Example 4-2: Derivation of Refrigerant Composition D2

An analysis was performed based on the results of Reference Example 5 to find the proportions of the components of R407E (refrigerant composition D2) whose components of the liquid phase in the supply source fall within the range of tolerance D (difluoromethane: 23.0 to 27.0 wt %, pentafluoroethane: 13.0 to 17.0 wt %, and 1,1,1,2-tetrafluoroethane: 58.0 to 62.0 wt %), even when R407E is transferred until the transfer rate reaches 80%.

Specifically, an analysis was performed in the same manner as in Reference Example 5 to find the lower limit and the upper limit of the proportions of the components with a low boiling point (difluoromethane and pentafluoroethane) before the transfer. The lower limit and the upper limit of the proportions of such components satisfy the following: the proportions of the components in the liquid phase of the refrigerant composition in the supply source fall within the range of tolerance D, even when R407E is transferred until the transfer rate reaches 80%. Table 25 and Table 26 illustrate the results (Table 25: the results of analysis of the lower limit of the proportions of components with a low boiling point, Table 26: the results of analysis of the upper limit of the proportions of components with a low boiling point).

TABLE 25

| Transfer Rate (%) | Proportions of Components of Liquid Phase in Supply Source (wt %) | | |
|---|---|---|---|
| | R32 | R125 | R134a |
| 0 | 24.8 | 14.9 | 60.3 |
| 10 | 24.7 | 14.9 | 60.4 |
| 20 | 24.6 | 14.8 | 60.6 |
| 30 | 24.5 | 14.8 | 60.7 |
| 40 | 24.4 | 14.7 | 60.9 |
| 50 | 24.3 | 14.7 | 61.0 |
| 60 | 24.1 | 14.6 | 61.3 |
| 70 | 23.9 | 14.5 | 61.6 |
| 80 | 23.6 | 14.4 | 62.0 |

TABLE 26

| Transfer Rate (%) | Proportions of Components of Liquid Phase in Supply Source (wt %) | | |
|---|---|---|---|
| | R32 | R125 | R134a |
| 0 | 26.0 | 16.0 | 58.0 |
| 10 | 25.9 | 16.0 | 58.1 |
| 20 | 25.9 | 15.9 | 58.2 |
| 30 | 25.7 | 15.9 | 58.4 |
| 40 | 25.6 | 15.9 | 58.5 |
| 50 | 25.5 | 15.8 | 58.7 |
| 60 | 25.3 | 15.7 | 59.0 |
| 70 | 25.1 | 15.6 | 59.3 |
| 80 | 24.8 | 15.5 | 29.7 |

Tables 25 and 26 indicate that the proportions of the components in the liquid phase of the refrigerant composition in the supply source fall within the range of tolerance D, under the conditions of a transfer rate at up to 80%, when the proportions of the components are as follows: difluoromethane 24.8 to 26.0 wt %, pentafluoroethane 14.9 to 16.0 wt %, and 1,1,1,2-tetrafluoroethane 58.0 to 60.3 wt % (refrigerant composition D2).

Example 4-3: Derivation of Refrigerant Composition D2

An analysis was performed based on the results of Reference Example 5 to find the proportions of the components of R407E (refrigerant composition D3) whose components of the liquid phase in the supply source fall within the range of tolerance D (difluoromethane: 23.0 to 27.0 wt %, pentafluoroethane: 13.0 to 17.0 wt %, and 1,1,1,2-tetrafluoroethane: 58.0 to 62.0 wt %), even when R407E is transferred until the transfer rate reaches 90%.

Specifically, an analysis was performed in the same manner as in Reference Example 5 to find the lower limit and the upper limit of the proportions of the components with a low boiling point (difluoromethane and pentafluoroethane) before the transfer. The lower limit and the upper limit of the proportions of such components satisfy the following: the proportions of the components in the liquid phase of the refrigerant composition in the supply source fall within the range of tolerance D, even when R407E is transferred until the transfer rate reaches 90%. Table 27 and Table 28 illustrate the results (Table 27: the results of analysis of the lower limit of the proportions of components with a low boiling point, Table 28: the results of analysis of the upper limit of the proportions of components with a low boiling point).

TABLE 27

| Transfer Rate (%) | Proportions of Components of Liquid Phase in Supply Source (wt %) | | |
|---|---|---|---|
| | R32 | R125 | R134a |
| 0 | 25.3 | 15.1 | 59.6 |
| 10 | 25.2 | 15.1 | 56.7 |
| 20 | 25.1 | 15.0 | 59.9 |
| 30 | 25.0 | 15.0 | 60.0 |
| 40 | 24.9 | 14.9 | 60.2 |
| 50 | 24.8 | 14.9 | 60.3 |
| 60 | 24.6 | 14.8 | 60.6 |
| 70 | 24.4 | 14.7 | 60.9 |
| 80 | 24.1 | 14.6 | 61.3 |
| 90 | 23.6 | 14.4 | 62.0 |

TABLE 28

| Transfer Rate (%) | Proportions of Components of Liquid Phase in Supply Source (wt %) | | |
|---|---|---|---|
| | R32 | R125 | R134a |
| 0 | 26.0 | 16.0 | 58.0 |
| 10 | 25.9 | 16.0 | 58.1 |
| 20 | 25.9 | 15.9 | 58.2 |
| 30 | 25.7 | 15.9 | 58.4 |
| 40 | 25.6 | 15.9 | 58.5 |
| 50 | 25.5 | 15.8 | 58.7 |
| 60 | 25.3 | 15.7 | 59.0 |
| 70 | 25.1 | 15.6 | 59.3 |
| 80 | 24.8 | 15.5 | 59.7 |
| 90 | 24.3 | 15.3 | 60.4 |

Tables 27 and 28 indicate that the proportions of the components in the liquid phase of the refrigerant composition in the supply source fall within the range of tolerance D, under the conditions of a transfer rate at up to 90%, when the proportions of the components are as follows: difluoromethane 25.3 to 26.0 wt %, pentafluoroethane 15.1 to 16.0 wt %, and 1,1,1,2-tetrafluoroethane 58.0 to 59.6 wt % (refrigerant composition D3).

Table 29 below illustrates the results of Examples 1-1 to 4-3.

TABLE 29

| Examples | Range of Tolerance | Possible Range of Transfer | Proportions of Components of Liquid Phase in Supply Source (wt %) | | |
|---|---|---|---|---|---|
| | | | R32 | R125 | R134a |
| Example 1-1 | Lower Limit for A<br>Upper Limit for A | Until 70% | 32.5<br>33.5 | 14.3<br>16.0 | 53.2<br>50.5 |
| Example 1-2 | Lower Limit for A<br>Upper Limit for A | Until 80% | 32.9<br>33.5 | 14.4<br>16.0 | 52.7<br>50.5 |
| Example 1-3 | Lower Limit for A<br>Upper Limit for A | Until 90% | 33.4<br>33.5 | 14.6<br>16.0 | 52.0<br>50.5 |
| Example 2-1 | Lower Limit for B<br>Upper Limit for B | Until 70% | 29.7<br>31.0 | 29.7<br>31.0 | 40.6<br>38.0 |
| Example 2-2 | Lower Limit for B<br>Upper Limit for B | Until 80% | 29.9<br>31.0 | 29.9<br>31.0 | 40.2<br>38.0 |
| Example 2-3 | Lower Limit for B<br>Upper Limit for B | Until 90% | 30.3<br>31.0 | 30.3<br>31.0 | 39.4<br>38.0 |
| Example 3-1 | Lower Limit for C<br>Upper Limit for C | Until 70% | 39.9<br>41.0 | 29.3<br>31.0 | 30.8<br>28.0 |
| Example 3-2 | Lower Limit for C<br>Upper Limit for C | Until 80% | 40.2<br>41.0 | 29.5<br>31.0 | 30.3<br>28.0 |
| Example 3-3 | Lower Limit for C<br>Upper Limit for C | Until 90% | 40.7<br>41.0 | 29.7<br>31.0 | 29.6<br>28.0 |
| Example 4-1 | Lower Limit for D<br>Upper Limit for D | Until 70% | 24.4<br>26.0 | 14.9<br>16.0 | 60.7<br>58.0 |
| Example 4-2 | Lower Limit for D<br>Upper Limit for D | Until 80% | 24.8<br>26.0 | 14.9<br>16.0 | 60.3<br>58.0 |
| Example 4-3 | Lower Limit for D<br>Upper Limit for D | Until 90% | 25.3<br>26.0 | 15.1<br>16.0 | 59.6<br>58.0 |

The invention claimed is:

1. A method for transferring a refrigerant composition containing difluoromethane, pentafluoroethane, and 1,1,1,2-tetrafluoroethane,
   the method comprising transferring a refrigerant composition from a liquid phase in a supply source to a supply destination,
   wherein the supply source is an airtight container,
   wherein the transfer is performed in an environment that a liquid temperature of the supply source is 40° C. or lower, and
   wherein the liquid phase of the refrigerant composition in the supply source before the transfer contains 32.5 to 33.5 wt % of difluoromethane, 14.3 to 16.0 wt % of pentafluoroethane, and 50.5 to 53.2 wt % of 1,1,1,2-tetrafluoroethane.

2. The method according to claim 1,
   wherein the liquid phase of the refrigerant composition in the supply source before the transfer contains 32.9 to 33.5 wt % of difluoromethane, 14.4 to 16.0 wt % of pentafluoroethane, and 50.5 to 52.7 wt % of 1,1,1,2-tetrafluoroethane.

3. The method according to claim 1,
   wherein the liquid phase of the refrigerant composition in the supply source before the transfer contains 33.4 to 33.5 wt % of difluoromethane, 14.6 to 16.0 wt % of pentafluoroethane, and 50.5 to 52.0 wt % of 1,1,1,2-tetrafluoroethane.

* * * * *